No. 711,519. Patented Oct. 21, 1902.
W. NEIL & A. J. BREDLOW.
CARBURETER.
(Application filed Nov. 6, 1901.)
(No Model.)
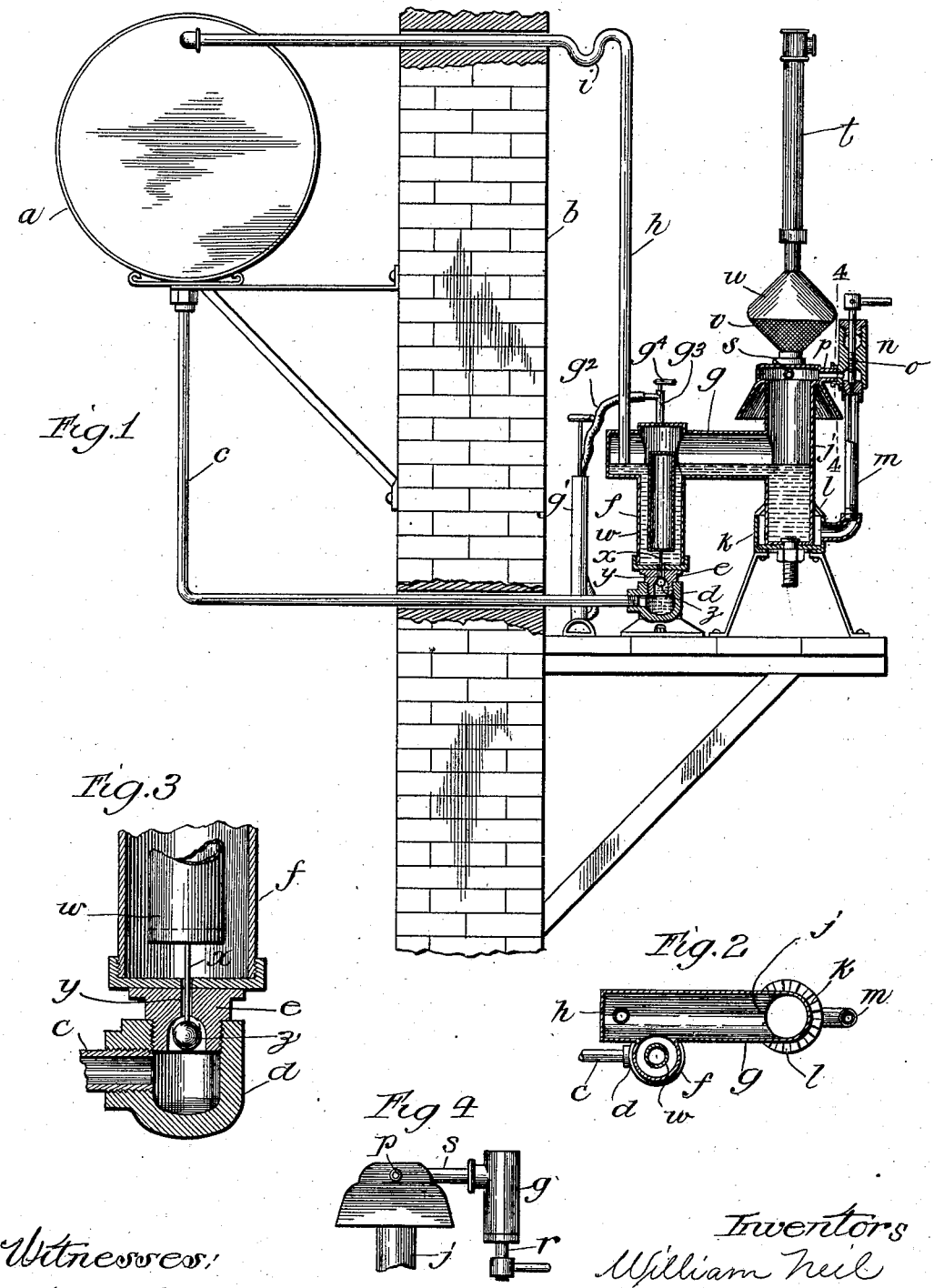

UNITED STATES PATENT OFFICE.

WILLIAM NEIL AND ALBERT J. BREDLOW, OF CHICAGO, ILLINOIS.

CARBURETER.

SPECIFICATION forming part of Letters Patent No. 711,519, dated October 21, 1902.

Application filed November 6, 1901. Serial No. 81,364. (No model.)

*To all whom it may concern:*

Be it known that we, WILLIAM NEIL and ALBERT J. BREDLOW, of Chicago, in the county of Cook and State of Illinois, have invented certain new and useful Improvements in Carbureters, of which the following is a full, clear, and exact description, reference being had to the accompanying drawings, forming a part of this specification, in which similar letters of reference in the different figures indicate like parts.

The primary object of our invention is to so construct a carbureter for generating gas from hydrocarbon oils that a constant level may be maintained in the generator, while the tendency to force oil from the gas-eduction opening as a result of the extinguishment of the generator-flame and the consequent variation in pressure within the generator may be avoided.

A further object is to provide means for forcing the products of condensation, should any occur, back into the tank.

With these objects in view our invention consists in the combination of elements hereinafter more particularly described and claimed.

In the drawings, Figure 1 represents an elevation, partly in section, of an apparatus embodying the features of our invention. Fig. 2 is a horizontal sectional view in plan. Fig. 3 is an enlarged vertical sectional view in detail of the float-valve mechanism; and Fig. 4 is a side view in elevation of a portion of the generator, said view being taken at right angles to that shown in Fig. 1, upon the line 4 4 shown in said figure.

Referring to the drawings, $a$, Fig. 1, represents a reservoir for the reception of hydrocarbon oil, said reservoir being represented as supported upon a bracket outside of and attached to the wall $b$ of a building. Leading from the bottom of said reservoir is a supply-pipe $c$, which is projected through said wall to the interior of the building, where it is tapped into an elbow-fitting $d$, into the top of which is screwed a valve-fitting $e$. A vertical cylindrical tube $f$ is screwed, brazed, or otherwise secured to the part $e$ and is in turn connected to and in open communication with a horizontal tube $g$, preferably in the manner clearly shown in Figs. 1 and 2.

Communicating with the tube $g$ is a pipe $h$, which is preferably extended vertically, as shown, and so adjusted that the lower end thereof is considerably below the top level of the tube $g$. Said pipe is carried upwardly, as shown, and conducted through the wall $b$ to a level at or near the top of the reservoir $a$. A double bend $i$ is formed in said pipe to constitute a trap for the purpose hereinafter stated.

A vertical generator-tube $j$ is brazed or otherwise connected to the tube $g$, to the base of which latter and surrounding the same is secured an annular burner $k$, having a series of openings $l$ formed in the top thereof to permit the escape of gas. Said burner is connected by means of an elbow-fitting, as shown, and a vertical tube $m$ to a valve-fitting $n$, having a needle-valve $o$ therein, which fitting is in turn connected by means of a short tube $p$, Fig. 1, with the top of the generator-tube $j$. A similar valve-fitting $q$, Fig. 4, in which the needle-valve $r$ is in a reversed position with respect to the valve $n$, so as to permit the gas to flow upwardly instead of downwardly, is connected with the top of the generator by means of a tube $s$, and the valve-opening in said fitting is adapted to direct the flow of gas upwardly into a distributing-pipe $t$, upon the lower end of which is formed a bell-mouthed enlargement $u$, open at the bottom to permit an inflow of air. A wire-gauze shield $v$ is placed around said opening and the valve-eduction opening to prevent ignition of the gas within the distributing-pipe.

Within the tube $f$ is placed a hollow metal float $w$, having a valve-stem $x$, which is extended downwardly through a vertical bore or feed-opening $y$ and is provided with a ball $z$ or other suitable valve adapted to fit upon a suitable valve-seat at the lower end of the feed-opening. Said float is so adjusted that when the oil is at its normal level, as shown in Fig. 1—that is to say, upon a level with the lower end of the pipe $h$—the valve $z$ will be unseated, and the oil will be free to flow upwardly through the feed-opening $y$; but when the oil-level in the generator tends to rise from any abnormal cause the float $w$ will rise with it, thus seating the valve $z$ and shutting off the admission of oil to the generator.

An air-pump $g'$, of any well-known construction, is connected by means of a tube $g^2$ to a valve-fitting $g^3$, in communication with the top of the tube $f$, said fitting being supplied with a valve $g^4$.

The operation of our improved carbureter is as follows: Oil being supplied to the reservoir, the air-pump is first operated to produce an initial pressure and then shut off by means of the valve $g^4$. The valve $o$ is then opened, and the carbureted air is thereby supplied to the burner $k$ and lighted. When the generator is sufficiently heated to generate the requisite supply of gas, the valve $r$ is opened to admit the gas to the distributing-pipe $t$, which it enters with sufficient force to induce a flow of air through the gauze $v$. The generation of gas produces a pressure in the generator, and whenever a sufficient amount of oil is consumed to expose the lower end of the pipe $h$ the gas under pressure flows upwardly through the pipe $h$ and into the reservoir $a$, thus maintaining a like pressure in both generator and reservoir; but inasmuch as there can be no backflow of gas so long as the lower end of the pipe $h$ is sealed by the oil the level of the latter remains, in effect, constant. Should, however, the generating-flame become extinguished, so that the gas ceases to generate or is produced less rapidly, the tendency to equalize the pressure in the reservoir and generator will cause a sudden inflow of oil from the former to the latter, and the gas-eduction valve being open oil would be forced out of it and, dripping upon the floor, would render the device objectionable and its use hazardous. The employment of the float-valve obviates this objection and overcomes this difficulty. The instant the oil-level rises in the generator the valve $z$ is seated and so remains until the reservoir cools sufficiently to condense the gas and reduce the pressure therein, when the oil again tends to assume its normal level.

While it is obvious that the entire apparatus may be placed within the building, we have preferred to show the reservoir outside. Inasmuch as the temperature of the reservoir would be lower in such a case and the consequent condensation greater we have provided the trap $i$ to catch such condensation as might result from the meeting of the gas with the lower temperature of the reservoir. Should a sufficient quantity accumulate to fill the trap, it would be forced back into the reservoir as a result of the accumulated pressure in the generator. In case the gas is consumed as rapidly as it is generated, the tendency would be for the fluid of lower temperature in the receiver to be brought into contact with the gas of higher temperature in the generator, thereby causing condensation in the latter. This possible objectionable result is prevented by the accumulation of liquid in the trap.

Having thus described our invention, we claim—

1. An apparatus of the class described in which is combined an oil-reservoir and generator, a pipe in communication with the upper portion of said reservoir and having its lower end upon a level below the top of the generator, a feed-pipe in communication with said reservoir and generator respectively and a normally open float-valve adjusted to close the feed-opening to the generator when the oil rises above the level of the lower end of said first-named pipe, substantially as described.

2. A carbureter in which is combined an oil-reservoir and generator the top and bottom of said reservoir respectively being in operative connection with said generator by means of separate conduits, the one from the top leading to a level below the top of said generator and the one from the bottom leading to a lower level, and a float-valve in communication with the oil-inlet of the latter and adjusted to close when the oil-level rises above the lower end of the former, substantially as described.

3. In a carbureter, the combination of an oil-reservoir, a generator, conduits leading respectively from a level at or near the top and from a level at or near the bottom of said reservoir to said generator, the former of said conduits being in communication with said generator at the oil-level desired to be maintained therein and the other below said level, and a normally open float-valve for closing the latter when said level is exceeded, substantially as set forth.

4. In a carbureter, the combination with an oil-reservoir, a generator, conduits leading respectively from a level at or near the top and from a level at or near the bottom of said reservoir to said generator, the former of said conduits being in communication with said generator at an oil-level desired to be maintained therein and the other below said level, a float-valve for closing the latter when said level is exceeded, suitable gas-eduction valves, and means for heating said generator, substantially as described.

5. An apparatus of the class described in which is combined an oil-reservoir, a generator, a feed-conduit connecting said generator with said reservoir at or near the bottom of the latter, a secondary conduit communicating with said reservoir at or near the top and with said generator at a predetermined oil-level, a trap in said conduit at or near its upper end, a normally open float-valve for closing said feed-conduit, suitable eduction-valves, and means for heating said generator, substantially as described.

In testimony whereof we have signed this specification, in the presence of two subscribing witnesses, this 28th day of October, 1901.

WILLIAM NEIL.
ALBERT J. BREDLOW.

Witnesses:
CHARLES L. HINE,
D. H. FLETCHER.